United States Patent [19]

Enomoto et al.

[11] 4,140,663
[45] * Feb. 20, 1979

[54] AIR DRYING HIGH SOLID COATING COMPOSITION

[75] Inventors: Satoru Enomoto, Fujisawa; Yutaka Mukaida, Tokyo; Mikiro Yanaka, Matsudo; Sadao Nishita, Tokyo; Hisayuki Wada, Tokyo; Hitoshi Takita, Tokyo, all of Japan

[73] Assignee: Kureha Chemical Industry Co., Ltd., Tokyo, Japan

[*] Notice: The portion of the term of this patent subsequent to May 3, 1994, has been disclaimed.

[21] Appl. No.: 837,540

[22] Filed: Sep. 28, 1977

[30] Foreign Application Priority Data

Oct. 1, 1976 [JP] Japan .................................. 51-18330

[51] Int. Cl.² ................................................ C09D 3/66
[52] U.S. Cl. ............................ 260/22 CB; 260/23 P; 260/33.2 R
[58] Field of Search .............. 260/33.2 R, 22 CB, 23 P

[56] References Cited

U.S. PATENT DOCUMENTS

| | | | |
|---|---|---|---|
| 2,407,479 | 9/1946 | D'Alelio | 260/22 CB |
| 2,957,837 | 10/1960 | Smith et al. | 260/33.2 R |
| 3,433,753 | 3/1969 | Farkas et al. | 260/23 P |
| 4,021,390 | 5/1977 | Enomoto et al. | 260/22 CB |

*Primary Examiner*—Ronald W. Griffin
*Attorney, Agent, or Firm*—Ostrolenk, Faber, Gerb & Soffen

[57] ABSTRACT

An air drying high solid coating composition containing 90% or more of solid components and consisting of (1) 95 – 50 parts by weight of low viscosity alkyd resin having an oil length of 60 or higher and a viscosity of $Z_4$ or lower, (II) 5 – 50 parts by weight of 1,1-bis-(1'-methyl-2'-vinyl-4',6'-heptadienoxy)-alkane, and if necessary, (III) other components such as pigments, organic solvents and additives. The coating composition is quite effective in the prevention of air pollution and the saving of resources.

7 Claims, No Drawings

AIR DRYING HIGH SOLID COATING COMPOSITION

BACKGROUND OF THE INVENTION

This invention relates to an air drying high solid coating composition which scarcely contains organic solvents.

In the coating work of conventional air drying coating materials, a large quantity of organic solvents have been used. The organic solvents are, however, evaporated into the air after the coating materials are applied, so that the organic solvents are very detrimental in view of the public nuisance such as air pollution, and in addition, it causes great loss in view of the using of resources.

In order to solve this problem, the content of organic solvents in coating materials should be reduced or solventless coating materials are to be used while maintaining the viscosities of coating materials within a value suitable for coating work.

As a countermeasure to the above, it is disclosed in Japanese Patent Laid-Open Publication No. 51-8323(1976) that the content of organic solvent can be reduced considerably by using a high solid coating composition which comprises a low viscosity unsaturated vegetable oil or alkyd resin modified with unsaturated vegetable oil fatty acid as a basic material and curing accelerators of metallic alcoholates or chelate compounds thereof for the curing of inner portion of coating film.

BRIEF SUMMARY OF THE INVENTION

The inventors of the present application have carried out eager and extensive studies with the purpose of further reducing the content of organic solvent from the product described in the above-mentioned reference. As a result, the air drying high solid coating composition of the present invention has been invented without losing any desirable properties, in which the viscosity of the coating composition has been lowered by diluting the above-mentioned low viscosity alkyd resin with hardly reactive diluent of low viscosity and low volatility.

It is, therefore, the primary object of the present invention to provide an improved air drying high solid coating composition which is free from the above-described disadvantage caused in the conventional art.

Another object of the present invention is to provide an air drying high solid coating composition which contains very little organic solvent.

A further object of the present invention is to provide a coating composition of low viscosity in spite of its high content of solid components.

In accordance with the present invention, the air drying high solid coating composition contains 90% by weight or more of solid components when its viscosity is 70 KU (measured at 25° C. with Krebs Stormer's viscometer) and it comprises (I) 95 - 50 parts by weight of low viscosity alkyd resin which is the reaction product of (a) saturated aliphatic or aromatic polybasic acids or their acid anhydrides, (b) polyhydric alcohols and (c) unsaturated vegetable oils or unsaturated vegetable oil fatty acids, said alkyd resin having an oil length of 60 or higher and a viscosity (measured at 25° C. with a Gardner-Holdt viscometer) of $Z_4$ or lower when the resin solid content is not less than 80% by weight, (II) 5 - 50 parts by weight of hardly volatile reactive diluent of the compound A which is represented by the general formula:

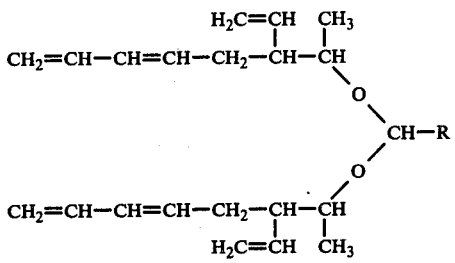

in which R indicates a hydrogen atom, an alkyl group having 1 to 18 carbon atoms, phenyl group, alkyl ($C_{1-18}$) phenyl group, cyclohexyl group or alkyl ($C_{1-18}$) cyclohexyl group and if necessary, (III) other components such as pigments, organic solvents and/or additives.

DETAILED DESCRIPTION OF THE INVENTION

In the present invention, the basic resin material is a mixture of the above-mentioned alkyd resin and hardly volatile reactive diluent. The coating composition of the present invention is prepared by adding not more than 400 parts by weight of pigment to 100 parts by weight of the basic resin material and if necessary, additives may be added to the mixture. Further, organic solvent in such an amount that the pigment can be well dispersed by the ordinary method is added to the above mixture to obtain a coating composition. The coating composition contains 90% or more (mostly more than 95%) of solid components and has a viscosity of 70 KU (measured at 25° C. with Krebs Stormer's viscometer) which value is most suitable for brush-application. If the content of organic solvent in the coating composition of the present invention is compared with that of a conventional coating material, for example, in the case of 100 parts by weight of pigment concentration, the conventional one contains only about 60% (provided the Krebs Stormer's viscosity is 70 KU at 25° C.) of solid components even when it is a high solid type, while the coating composition of the present invention contains not less than 90% of solid components. In other words, the solid content of about 60% in the conventional coating composition means that about 67 parts by weight of organic solvent is contained against 100 parts by weight of solid components. In the coating composition of the present invention containing at least 90% of solid components, the content of organic solvent is 11 parts by weight to 100 parts by weight of solid components. Accordingly, from the organic solvent ratio of 67 parts to 11 parts, it may be concluded that the content of organic solvent in the coating composition of the present invention is about one sixth of the content in the conventional one. Further, the solid content of about 95% is the most common example in the present invention, in which the content of organic solvent is about 5 parts by weight per 100 parts by weight of solid content. Thus the content of organic solvent is about one thirteenth as compared with that of the conventional coating material. The coating composition of the present invention is of great significance with a view to the prevention of air pollution and saving of resources.

The compound A used in the present invention is a hardly volatile reactive diluent is prepared by the condensation between a precursory material of 1-methyl-2-vinyl-4,6-heptadiene-1-ol and aldehydes represented by the general formula: RCHO. Exemplified as the aldehydes are aliphatic aldehydes, alicyclic aldehydes, and aromatic aldehydes having 1 to 18 carbon atoms. Especially, aliphatic aldehydes having not more than 8 carbon atoms such as formaldehyde acetaldehyde, butyraldehyde and octyl aldehyde are preferably used.

Since the above compound A has conjugated double bonds and vinyl bonds, the reactivity is high and further the viscosity of the compound A is low (about 6 centistokes).

The alkyd resin modified with unsaturated vegetable oil or unsaturated vegetable oil fatty acid that is used in the present invention is high in the solid content but low in the viscosity. This alkyd resin is the reaction product of saturated aliphatic or aromatic polybasic acids or their acid anhydrides, polyhydric alcohols and unsaturated vegetable oils or unsaturated vegetable oil fatty acids. Further, it is necessary that the oil length of the alkyd resin is 60 or more and the viscosity thereof is not more than $Z_4$ (measured at 25° C. with a Gardner-Holdt viscometer) with the resin solid content of 80% or more. Exemplified as the above-mentioned saturated aliphatic polybasic acids or their acid anhydrides are adipic acid, sebacic acid, azelaic acid, succinic anhydride, and dodecyl succinic anhydride, and they can be used either alone or in combination of two or more. As the aromatic polybasic acids or their anhydrides, there are exemplified phthalic anhydride, isophthalic acid, dimethyl terephthalic acid, terephthalic acid, tetrahydrophthalic anhydride and endomethylene tetrahydrophthalic anhydride which can also be used alone or as a mixture of two or more. Exemplified as the polyhydric alcohols are one or the mixture of two or more of ethylene glycol, diethylene glycol, triethylene glycol, propylene glycol, neopentyl glycol, 1,2-butylene glycol, 1,3-butylene glycol 2,3-butylene glycol, 1,4-butylene glycol, 1,6-hexane diol, isopentyl glycol, trimethylolethane, trimethylolpropane, pentaerythritol, dipentaerythritol, glycelol, Cardura E (trademark, glycidyl ester of synthetic tertiary carboxylic acid made by Shell Chemical Co., Japan), and diglycelol. Used as the unsaturated vegetable oils or unsaturated vegetable oil fatty acids are one or the mixture of two or more of linseed oil, safflower oil, soybean oil, dehydrated castor oil, tung oil, hempseed oil, cotton seed oil, sunflower oil, their fatty acids, tall oil fatty acid, Hidiene Fatty Acid (trademark, conjugated fatty acid comprising mainly linolic acid made by Soken Chemical Co., Japan), and Pamolyn (trademark conjugated fatty acid comprising mainly linolic acid made by Hercules Inc. U.S.A.). It should be noted, however, that the above are only examples and the present invention is not restricted to them.

In connection with the quantity of the compound A used as a reactive diluent in the present invention, if less than 5% by weight of the compound A is used, the coating composition of quite high solid content with an optimum viscosity for application can not be produced, and on the other hand, if more than 50% by weight of the compound A is used, the film properties become worse owing to the existence of the excess reactive diluent. That is, water resistance, weather resistance and corrosion resistance are considerably lowered so that the advantage of the air drying coating composition is impaired and the composition can not be practically used.

In the present invention, metallic alcoholates or chelate compounds thereof may be added as a curing promotor of inner portion of coating film. The amount to be added is preferably in the range of 1 – 10 parts by weight to 100 parts by weight of vehicle component. If it is less than 1 part by weight, the effect of added curing promotor is too small, while the addition of more than 10 parts by weight will impair the storage stability of the coating composition. As the above metallic alcoholates or chelate compounds thereof, commonly known compounds of aluminum and titanium are used.

The air drying high solid coating composition of the present invention can be advantageously used for forming coating films at ordinary temperatures. Also, the composition can be thermally cured or it can be combined with other cross-linking agents.

In order that those skilled in the art may better understand the present invention and the manner in which it may be practised, the following examples are given as merely illustrative and in no way restrictive of the invention. In these examples, unless otherwise indicated, parts and percents are by weight.

EXAMPLE 1

A 5 liter four neck round bottom flask equipped with a thermometer, stirrer, reflux condenser, water separator, and nitrogen gas inlet tube was fed with 750 parts of linseed oil and 100.7 parts of pentaerythritol, and the air in the flask was replaced with nitrogen gas. The contents in the flask was heated to 230° C. with stirring, then 0.75 part of litharge was added into the flask at 230° C. It was further heated to 240° C. and maintained at that temperature for 30 minutes. After that, the contents was cooled to 200° C. and 170 parts of phthalic anhydride, 50 parts of mineral spirit and a very small amount of defoamer were added into the flask, and further, the contents in the flask was allowed to react at 240° C. for 6 hours. The viscosity of the obtained alkyd varnish was UV, the acid value thereof was 1.8, and the solid content thereof was 95.4%.

EXAMPLE 2

Reactions were carried out in like manner as the above Example 1, in which safflower oil was used in place of the linseed oil. As a result, alkyd resin varnish of 1.7 in acid value and UV in viscosity was prepared. The solid content of this varnish was 95.0%.

EXAMPLE 3

A 5 liter four neck round bottom flask which is the same as that of Example 1, was fed with 578 parts of safflower oil fatty acid, 65 parts of ethylene glycol, 147 parts of pentaerythritol, 281 parts of phthalic anhydride and a very small amount of defoamer. The air in the flask was then replaced with nitrogen gas and the flask was heated to 160° C. After that, the temperature of the contents was further raised gradually to 240° C. in two hours and a half and the contents was further allowed to react for 9 hours. The reaction product was diluted with xylene so as to make the solid content 80%. Thus obtained product was 3.8 in acid value, $Z_2$ in viscosity and 80.3% in solid content.

EXAMPLE 4

Each of 5, 25 and 50 parts of 1,1-bis-(1'-methyl-2'-vinyl-4',6'-heptadienoyl)-ethane was added to each of 95, 75 and 50 parts (as solid) of the long oil alkyd resin varnishes that had been prepared in Examples 1 - 3. To each of them were added 83 parts of titanium dioxide, 13 parts of calcium carbonate, 0.05 part (as metal) of cobalt naphthenate, 0.5 part (as metal) of lead naphthenate, 5 parts of ALM-1 (trademark of aluminum acetylacetone chelate compound made by The Nippon Synthetic Chemical Industry Co., Ltd. Japan) and a small amount of mineral spirit (so as to adjust the viscosity suitable for dispersing the pigments). The mixture were dispersed by a shaker for 45 minutes to disperse the pigments. The thus obtained coating compositions were diluted to 70 KU in viscosity (measured by Krebs Stormer's viscometer) with mineral spirit and they were used for the tests of coating films.

The results of the tests are shown in the following Table 1 and Table 2.

Hardness

The coated surface was scratched by using Mitsubishi UNI Pencils (trademark, made by Mitsubishi Pencil Co., Ltd.) of 6B to 9H in hardness. The value of hardness was represented by the hardest pencil with which any scratch was not made (the softer grade next to the pencil which made scratches on the coated surface).

Erichsen Test

An Erichsen film tester was used at 20° C.

Impact Test

Measured at 20° C by using a weight of 500 g, 0.5 inch in diameter, and a Du Point impact tester.

Adhesiveness

Table 1

(Tested after 7 days drying at 20° C, 75% R.H.)

| Sample No. | Kind of alkyd | Ratio of alkyd: reactive diluent* | Solid content % at 70 KU in visc. | Drying time (Curing) | Pencil hardness | Erichsen film test | Du Pont impact test Back side | Du Pont impact test Front side | Gloss (60°) | Adhesiveness (mild steel sheet*) |
|---|---|---|---|---|---|---|---|---|---|---|
| 1 | Example 1 | 95:5 | 90.3 | 6$^{hr}$00$^{min}$ | 2B | 8mm < | >500g × 50cm | >500g × 50cm | 95 | ⊚ |
| 2 |  | 75:25 | 95.8 | 6:00 | B | " | " | " | 94 | ⊚ |
| 3 |  | 50:50 | 97.7 | 5:30 | B | 7mm | 500 × 0 | 500 × 30 | 96 | ⊚ |
| 4 | Example 2 | 95:5 | 90.5 | 6:20 | 2B | " | >500 × 50 | >500 × 50 | 95 | ⊚ |
| 5 |  | 75:25 | 96.0 | 6:00 | B | " | " | " | 95 | ⊚ |
| 6 |  | 50:50 | 98.1 | 5:50 | B | 7mm | 500 × 45 | 500 × 30 | 94 | ⊚ |
| 7 | Example 3 | 95:5 | 90.0 | 5:00 | B | " | >500 × 50 | >500 × 50 | 95 | ⊚ |
| 8 |  | 75:25 | 94.1 | 5:00 | F | " | " | " | 96 | ⊚ |
| 9 |  | 50:50 | 97.0 | 4:30 | F | 8mm | 500 × 45 | 500 × 40 | 96 | ⊚ |
| 10 | Example 1 | 100:0 | 87.0 | 7:00 | 2B | " | >500 × 50 | >500 × 50 | 96 | ⊚ |
| 11 | Example 2 | 100:0 | 88.3 | 7:10 | 2B | " | " | " | 97 | ⊚ |
| 12 | Example 3 | 100:0 | 85.4 | 5:00 | B | " | " | " | 95 | ⊚ |
| 13 | Example 1 | 40:60 | 98.1 | 5:30 | B | 6mm | 500 × 30 | 500 × 20 | 94 | ⊚ |
| 14 | 1 | 30:70 | 98.5 | 5:30 | B | 5mm | 500 × 20 | 500 × 10 | 94 | ○ |

*The marks are as follows:
⊚ Good, ○ Fair, ⊕ Poor, X Bad

Table 2

| Sample No. | Kind of alkyd resin | Ratio of alkyd: reactive diluent | Water resistance* 1 day | 3 days | 7 days | 14 days | Weather resistance (Sunshine weather-ometer) Initial (60° Gloss) | 500 hours (60° Gloss) | Salt spray test* 1 day | 14 days |
|---|---|---|---|---|---|---|---|---|---|---|
| 1 | Example 1 | 95:5 | ⊚ | ⊚ | ⊚ | ⊚ | 95 | 76 | ⊚ | ⊚ |
| 2 |  | 75:25 | ⊚ | ⊚ | ⊚ | ⊚ | 94 | 60 | ⊚ | ⊚ |
| 3 |  | 50:50 | ⊚ | ⊚ | ○ | ○ | 96 | 40 | ⊚ | ○ |
| 4 | Example 2 | 95:5 | ⊚ | ⊚ | ⊚ | ⊚ | 95 | 70 | ⊚ | ⊚ |
| 5 |  | 75:25 | ⊚ | ⊚ | ⊚ | ⊚ | 95 | 63 | ⊚ | ⊚ |
| 6 |  | 50:50 | ⊚ | ⊚ | ○ | ○ | 95 | 68 | ⊚ | ○ |
| 7 | Example 3 | 95:5 | ⊚ | ⊚ | ⊚ | ⊚ | 94 | 68 | ⊚ | ⊚ |
| 8 |  | 75:25 | ⊚ | ⊚ | ⊚ | ⊚ | 95 | 60 | ⊚ | ⊚ |
| 9 |  | 50:50 | ⊚ | ⊚ | ○ | ○ | 96 | 39 | ⊚ | ○ |
| 10 | Example 1 | 100:0 | ⊚ | ⊚ | ⊚ | ⊚ | 96 | 77 | ⊚ | ⊚ |
| 11 | Example 2 | 100:0 | ⊚ | ⊚ | ⊚ | ⊚ | 96 | 75 | ⊚ | ⊚ |
| 12 | Example 3 | 100:0 | ⊚ | ⊚ | ⊚ | ⊚ | 97 | 76 | ⊚ | ⊚ |
| 13 | Example 1 | 40:60 | ⊚ | ⊚ | ⊕ | X | 95 | 35 | ⊚ | ⊕ |
| 14 | 1 | 30:70 | ⊚ | ⊚ | ⊕ | X | 94 | 30 | ⊚ | ⊕ |

*The marks are as follows:
⊚ Good, ○ Fair, ⊕ Poor, X Bad

Test Conditions

Oil primer was applied on mild steel sheets and they were dried for 2 days at 25° C. and 75% relative humidity. Then test samples were applied on the sheets and dried for 7 days at 25° C. and 75% relative humidity.

Film thicknesses

Both the primer and finishing were 30 to 40 microns.

100 checkered squares (1 × 1 mm) were made by cutting the coating film with a knife. A piece of self-adhesive tape was then applied to the cut squares and quickly peeled off.

Water resistance

Test piece was immersed in water at 20° C. for 1 day, 3 days 7 days and 14 days then the occurrence of change in coating film was observed.

Water resistance

An accelerated test was carried out for 500 hours by using sunshine Weather-O-Meter.

Salt spray Test

Measured according to JIS (Japanese Industrial Standards) Z 2371.

What is claimed is:

1. An air drying high solid coating composition containing 90% by weight or more of solid components when its viscosity is 70 KU (measured at 25° C. with Krebs Stormer's viscometer), said coating composition comprising:
   (I) 95 – 50 parts by weight of low viscosity alkyd resin which is the reaction product of (a) saturated aliphatic or aromatic polybasic acid or its acid anhydride, (b) polyhydric alcohol, and (c) unsaturated vegetable oil or unsaturated vegetable oil fatty acid, said alkyd resin having an oil length of 60 or higher and a viscosity (measured at 25° C. with a Gardner-Holdt viscometer) of $Z_4$ or lower when the resin solid content is not less than 80% by weight, and
   (II) 5 – 50 parts by weight of the compound A which is represented by the general formula:

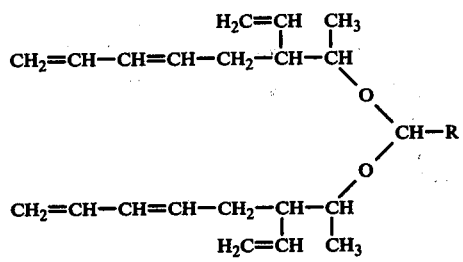

in which R indicates a hydrogen atom, an alkyl group having 1 to 18 carbon atoms, phenyl group, alkyl ($C_{1-18}$) phenyl group, cyclohexyl group or alkyl ($C_{1-18}$) cyclohexyl group.

2. A coating composition as claimed in claim 1, wherein R is a hydrogen atom or an alkyl group having 1 to 18 carbon atoms.

3. A coating composition as claimed in claim 1, wherein said aliphatic or aromatic polybasic acid or its anhydride is selected from the group consisting of adipic acid, sebacic acid, azelaic acid, succinic anhydride, dodecyl succinic anhydride, phthalic anhydride, isophthalic acid, dimethyl terephthalic acid, terephthalic acid, tetrahydrophthalic anhydride, endomethylene tetrahydrophthalic anhydride and mixtures thereof.

4. A coating composition as claimed in claim 1, wherein said polyalcohol is selected from the group consisting of ethylene glycol, triethylene glycol, diethylene glycol, propylene glycol, neopentyl glycol, 1,2-butylene glycol, 1,3-butylene glycol, 2,3-butylene glycol, 1,4-butylene glycol, 1,6-hexane diol, isopentyl glycol, trimethylolethane, trimethylolpropane, pentaerythritol, dipentaerythritol, glycelol, glycidyl ester of synthetic tertiary carboxylic acid diglycelol and mixtures thereof.

5. A coating composition as claimed in claim 1, wherein said unsaturated vegetable oil or unsaturated vegetable oil fatty acid is selected from the group consisting of linseed oil, safflower oil, soybean oil, dehydrated castor oil, tung oil, hempseed oil, cotton seed oil, sunflower oil, their fatty acids, tall oil fatty acid, conjugated fatty acid comprising mainly linolic acid and mixtures thereof.

6. A coating composition as claimed in claim 1, wherein said compound A is 1,1-bis(1'-methyl-2' vinyl-4',6'-heptadienoxy ethane.

7. A coating composition as claimed in claim 1 containing a pigment.

* * * * *